United States Patent [19]
Yamane

[11] Patent Number: 5,434,691
[45] Date of Patent: Jul. 18, 1995

[54] COMMUNICATIONS SYSTEM HAVING OPTICAL TRANSMISSION LINE SWITCHING SYSTEM

[75] Inventor: Kazuo Yamane, Kawasaki, Japan
[73] Assignee: Fujitsu Limited, Kawasaki, Japan
[21] Appl. No.: 342,018
[22] Filed: Nov. 16, 1994

Related U.S. Application Data

[63] Continuation of Ser. No. 261,138, Jun. 15, 1994, abandoned, which is a continuation of Ser. No. 944,357, Sep. 14, 1992, abandoned.

[30] Foreign Application Priority Data

Sep. 18, 1991 [JP] Japan .................. 3-267111

[51] Int. Cl.⁶ .................. H04B 10/08; H04J 14/00
[52] U.S. Cl. .................. 359/117; 359/110; 370/16
[58] Field of Search ............. 359/110, 117, 152, 164, 359/173, 124, 125, 115; 370/16, 16.1; 385/24

[56] References Cited

U.S. PATENT DOCUMENTS

| | | | |
|---|---|---|---|
| 4,347,605 | 8/1982 | Hashizume et al. | 370/16 |
| 4,393,493 | 7/1983 | Edwards | 370/16 |
| 4,837,760 | 6/1989 | Reid et al. | 370/16 |
| 5,014,261 | 5/1981 | Shinbashi et al. | 370/16 |
| 5,069,521 | 12/1981 | Hardwick | 359/110 |
| 5,091,796 | 2/1992 | Nishimura et al. | 359/110 |
| 5,109,296 | 4/1992 | Fukushima et al. | 359/110 |
| 5,216,666 | 6/1993 | Stalick | 370/16.1 |
| 5,327,275 | 7/1994 | Yamane et al. | 359/110 |

FOREIGN PATENT DOCUMENTS

| | | |
|---|---|---|
| 483790 | 5/1992 | European Pat. Off. . |
| 0603237 | 1/1985 | Japan . |
| 61-234634 | 10/1986 | Japan . |
| 2233851 | 1/1991 | United Kingdom . |

OTHER PUBLICATIONS

Y. Higo et al., "An Intelligent Fiber Optic Transmission System with Internal Switching Capabilities", *IEEE Global Telecommunications Conf. & Exhibition*, pp. 0987–0991 (1988).
O. Källgren et al., "Protection Switching Systems 1:1 and 1:N", *Ericsson Review*, pp. 85–91 (1987).
K. Aida et al., "Optical Protection Switches for Trunk Transmission Systems", *IEEE International Conf. on Communications*, pp. 0001–0005 (1988).

*Primary Examiner*—Leo H. Boudreau
*Assistant Examiner*—Rafael Bacara
*Attorney, Agent, or Firm*—Armstrong, Westerman, Hattori, McLeland & Naughton

[57] ABSTRACT

A communications system includes a plurality of optical transmission lines in an active system and an optical transmission line in a protection system, and transmitter/receiver devices connected to respective ends of the optical transmission lines. The transmitter/receiver devices respectively include a first interface unit for establishing a first interface with signal transmission lines, a second interface unit for establishing a second interface with one of the optical transmission lines, a first multiplexer/demultiplexer unit for executing a first multiplexing and demultiplexing operation, and a second multiplexer/demultiplexer unit for executing a second multiplexing and demultiplexing operation. Further, the transmitter/receiver devices respectively include a switching unit, which is provided between the first and second multiplexer/demultiplexer units, for selectively coupling the first multiplexer/demultiplexer units in the active system with the first multiplexer/demultiplexer units in the protection system by means of optical fiber cables.

15 Claims, 10 Drawing Sheets

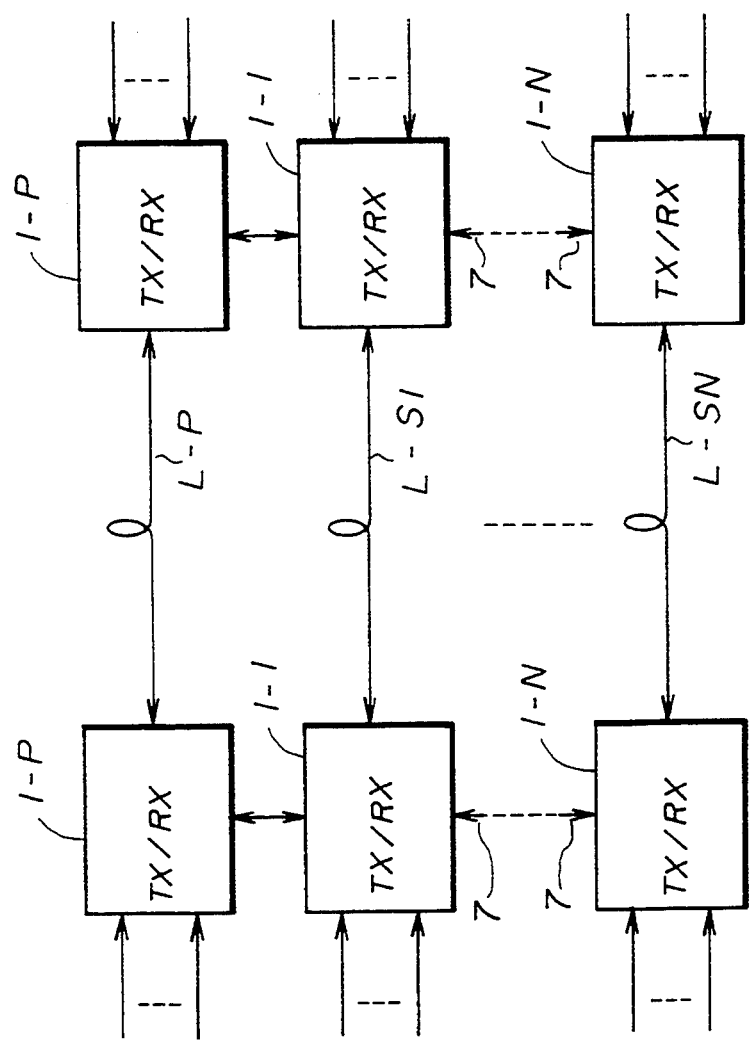

SWITCHING CONTROL

SWITCHING CONTROL

COMMUNICATIONS SYSTEM HAVING OPTICAL TRANSMISSION LINE SWITCHING SYSTEM

This application is a continuation of application Ser. No. 08/261,138 filed Jun. 15, 1994, now abandoned, which was a continuation of application Ser. No. 07/944,357 filed Sep. 14, 1992, now abandoned.

BACKGROUND OF THE INVENTION

1. Field of the Invention

The present invention generally relates to optical fiber communications systems, and more particularly to a transmission line switching system for switching from an optical transmission line in an active system to an optical transmission line in a protection system when a fault has occurred in the above optical transmission line in the active system.

2. Description of the Related Art

Recently, optical fiber communications systems capable of transferring a large quantity of data by means of an optical fiber have been proposed. A fault which has occurred in an optical fiber will cause great damage to users. Hence, it is very important to ensure reliability of an optical transmission system including optical fibers.

FIG. 1 shows a conventional optical communications system of a synchronous type, which includes a protection-system transmission line L-P and an active-system transmission line L-S1, which is now used for communications. In actuality, the communications system includes a plurality of active-system transmission lines. The transmission lines L-P and L-S1 are respectively made of optical fibers. Two transmitter/receiver devices 1-P in the protection system are connected to the respective ends of the protection-system line 1-P. Similarly, two transmitter/receiver devices 1-1 in the active system are connected to the respective ends of the active-system line. Each of the transmitter/receiver devices 1-P and 1-1 is made up of a low-bit-rate interface unit 2, a multiplexer/demultiplexer unit 3, and a high-bit-rate interface unit 4. A switching controller EX, which is connected to, for example, terminals (not shown), is connected in common to the low-bit-rate interface units 2 of the transmitter/receiver devices 1-P and 1-1. FIG. 1 shows two switching controllers EX. The interface unit 2 has the function of converting a light signal into an electric signal and vice versa.

During normal operation, the transmitter/receiver devices 1-1 in the active system communicate with each other, and the transmitter/receiver devices 1-P in the protection system communicate with each other. If a fault has occurred in the transmission line L-S1 in the active system, a monitor device (not shown) for monitoring the status of the transmission lines L-P and L-S1 detects the above fault, and controls the switching controllers EX so that low-bit-rate data is sent to and received from the transmitter/receiver devices 1-P in the protection system.

FIG. 2 shows another conventional optical communications system. The optical communications system shown in FIG. 2 does not include the switching controllers EX shown in FIG. 1. The high-bit-rate interface unit 4 of each of the transmitter/receiver units 1-P and 1-1 is composed of a first high-bit-rate interface unit 4S in the active system and a second high-bit-rate interface unit 4P in the protection system.

During the normal operation, the high-bit-rate interface units 4S in the active system communicate with each other, and the high-bit-rate interface units 4S in the protection system communicate with each other. If a fault has occurred in the transmission line L-S1 in the active system, a monitor device (not shown) controls the transmitter/receiver units 1-P and 1-1 so that the second high-bit-rate interface units 4P in the protection system start to operate. Then, the high-bit-rate interface units 4P in the protection and active systems are connected to each other, as shown in FIG. 2. In this manner, the transmission line L-S1 in which a fault has occurred is replaced by the transmission system L-P in the protection system, and data transfer continues.

However, the conventional system shown in FIG. 1 has a disadvantage in that it needs the switching controllers EX and hence the system has a large size. In addition, there are various interface types, such as an electric type and an optical type, and hence it is necessary to provide the low-bit-rate interface units for the respective interface types.

The conventional system shown in FIG. 2 has the following disadvantages. In general, synchronizing signal sources (not shown) provided for the multiplexer/demultiplexer units 3 with timing signals may be separately provided in the protection system and the active system, and normally do not operate with identical timings. Strictly speaking, the frequencies of the synchronizing signals may be slightly different from each other. When a fault has occurred in the transmission line in the active system, a connection is made between the high-bit-rate interface units 4P respectively provided in the protection system and the active system. The synchronizing signal sources in the protection system and the active system operate independently of each other, and hence it is not possible to directly send data to the transmission line 1-P in the protection system. If data is directly sent to the transmission line 1-P, an instantaneous break will occur. As a result, data from the active system is supplied to the multiplexer/demultiplexer unit 3 in which the data is synchronized with the synchronizing signal in the protection system and overhead bits are multiplexed with the data. The above operation of the multiplexer/demultiplexer unit 3 is very complex.

SUMMARY OF THE INVENTION

It is a general object of the present invention to provide an optical communications system having a transmission line switching system, in which the above disadvantages are eliminated.

A more specific object of the present invention is to provide an optical communications system having a transmission line switching system which has a simple structure for switching optical transmission lines between the active system and the protection system.

The above objects of the present invention are achieved by an optical communications system configured as follows. The optical communications system includes a plurality of optical transmission lines in an active system and an optical transmission line in a protection system, and transmitter/receiver devices connected to respective ends of the optical transmission lines. The transmitter/receiver devices respectively include a first interface unit for establishing a first interface with electric signal transmission lines, a second interface unit for establishing a second interface with one of the optical transmission lines, a first multiplexer/demultiplexer unit for executing a first multiplexing and demultiplexing operation, and a second multiplexer/demultiplexer unit for executing a second multiplexing and demultiplexing operation. Further, the transmitter/receiver devices respectively include a switching unit, which is provided between the first and second multiplexer/demultiplexer units, for selectively coupling the first and second multiplexer/demultiplexer units in the active system with the first and second multiplexer/demultiplexer units in the protection system by means of optical fiber cables.

BRIEF DESCRIPTION OF THE DRAWINGS

Other objects, features and advantages of the present invention will become more apparent from the following detailed description when read in conjunction with the accompanying drawings, in which:

FIG. 9 is a block diagram of an optical communications system according to a second embodiment of the present invention;

DESCRIPTION OF THE PREFERRED EMBODIMENTS

Figure 3:
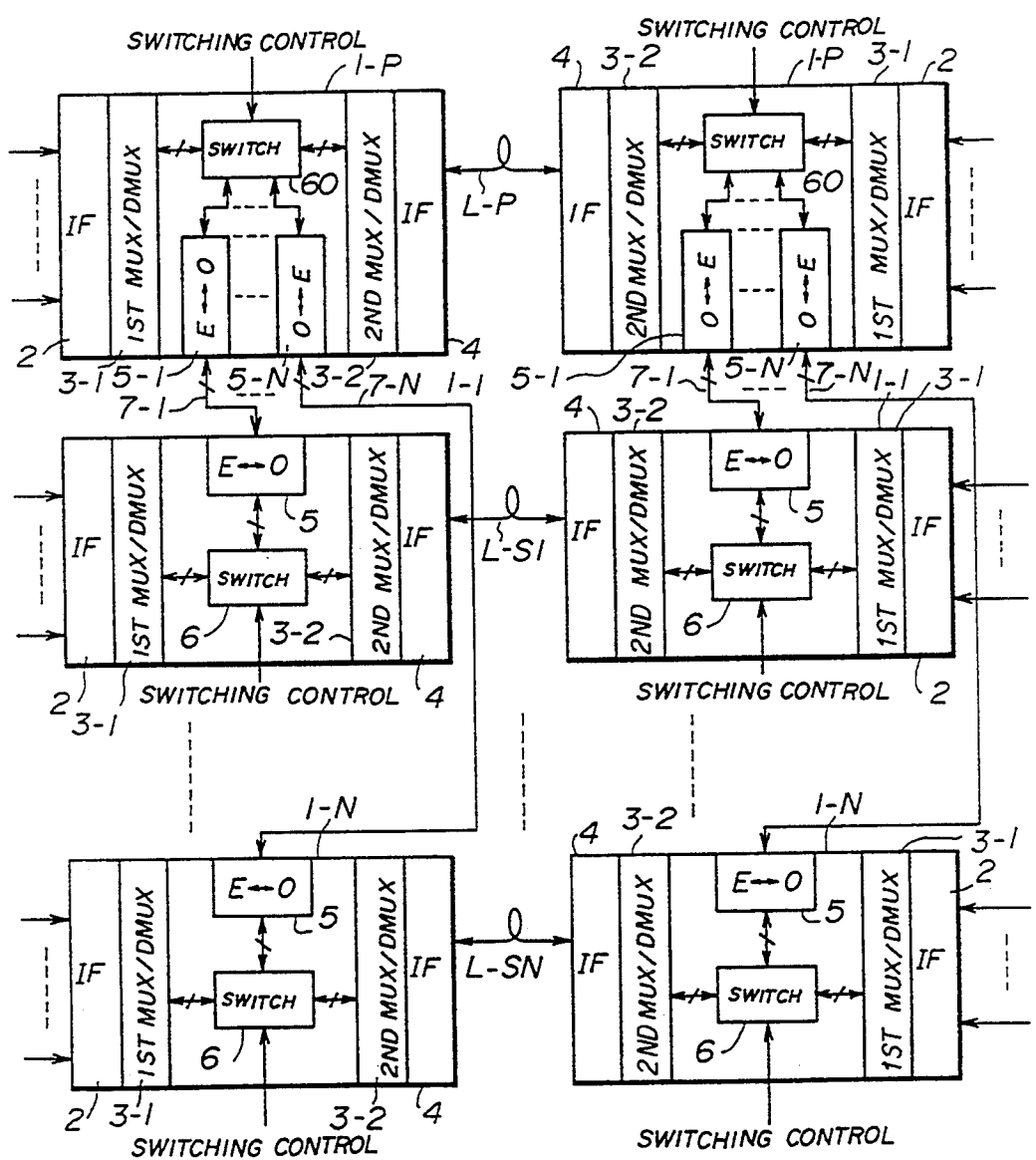
FIG. 3 is a block diagram of an optical communications system according to a first embodiment of the present invention.

FIG. 3 is a block diagram of an optical communications system according to a first embodiment of the present invention for an optical fiber communications system in which a protection system is provided for N transmission lines in the active system. In FIG. 3, parts that are the same as parts shown in the previous figures are given the same reference numerals as previously. As shown in FIG. 3, two transmitter/receiver devices 1-i (i=1, 2 ... N) are respectively connected to respective ends of N transmission lines L-S1–L-SN in the active system. Two transmitter/receiver devices 1-P are connected to respective ends of the transmission line L-P in the protection system.

Each of the two transmitter/receiver devices 1-P comprises the low-bit-rate interface unit 2, two multiplexer/demultiplexer units 3-1 and 3-2, the high-bit-rate interface unit 4, a switching unit 60, and N conversion units 5-1–5-N. Each of the conversion units 5-1–5-N has the function of converting an electric signal into a light signal and converting a light signal into an electric signal. N optical fiber cables 7-1–7-N are connected to the conversion units 5-1–5-N, respectively. As will be described later, it is preferable that each of the N optical fibers be formed with a ribbon-type cable including M optical fibers, where M denotes the number of signals to be multiplexed by each of the first multiplexer/demultiplexer units 3-1. The switching unit 60 in each of the transmitter/receiver devices 1-P in the protection system is connected between the multiplexer/demultiplexer units 3-1 and 3-2. The conversion units 5-1–5-N are connected between the switching unit 60 and the optical fiber cables 7-1–7-N, as shown in FIG. 3.

Each of the transmitter/receiver devices 1-1–1-N in the active system comprises the low-bit-rate interface unit 2, two multiplexer/demultiplexer units 3-1 and 3-2, the high-bit-rate interface unit 4, a conversion unit 5, and a switching unit 6. The conversion unit 5 in each of the transmitter/receiver units 1-1–1-N, which has the same function as each of the conversion units 5-1–5-N, is connected to one of the conversion units 5-1–5-N in one of the two transmitter/receiver devices 1-P. For example, the conversion units 5-1 of the transmitter/receiver devices 1-P are respectively connected to the conversion units 5 of the transmitter/receiver devices 1-1. The switching unit 6 in each of the transmitter/receiver devices 1-1–1-N is configured in the same manner as the switching unit 60 in each of the transmitter/receiver devices 1-P in the protection system. The switching units 6 and 60 are supplied with respective switching control signals, as will be described below.

Figure 4:
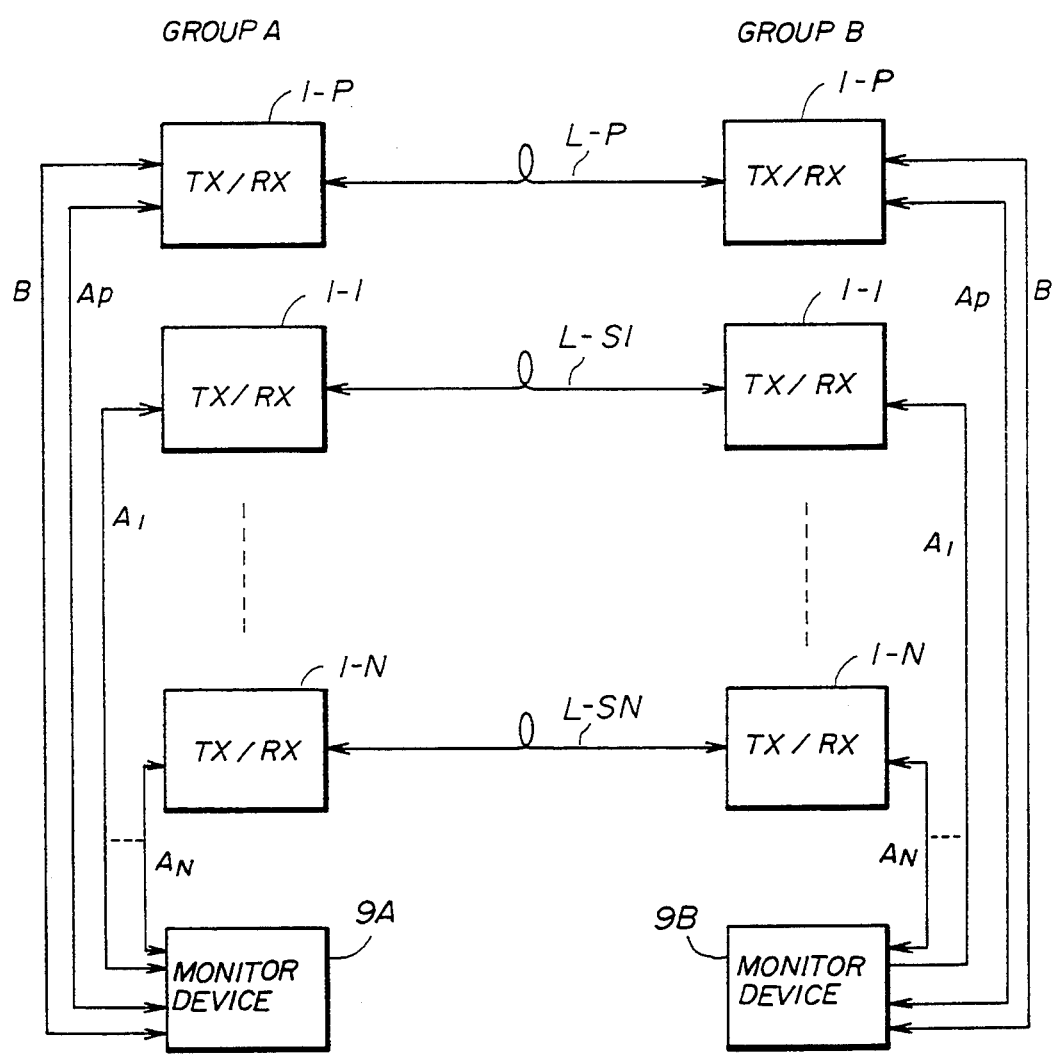
FIG. 4 is another block diagram of the optical communications system according to the first embodiment of the present invention.

As shown in FIG. 4, a monitor device 9A is provided in common to a group A including one of the two transmitter/receiver units 1-P in the protection system, and the N transmitter/receiver units 1-1–1-N in the active system. Similarly, a monitor device 9B is provided in common to a group B including the other transmitter/receiver unit 1-P in the protection system, and the other N transmitter/receiver units 1-1–1-N in the active system. In FIG. 4, Ap denotes information concerning a fault which has occurred in the protection system, and a switching control signal transferred from the monitor devices 9A and 9B to the corresponding transmitter/receiver devices 1-P in the protection system. The above fault information is transferred from the transmitter/receiver devices 1-P to the corresponding monitor devices 9A and 9B. A1–A$_N$ respectively denote information concerning faults which have occurred in the active system, and switching control signals transferred from the monitor devices 9A and 9B and the corresponding transmitter/receiver devices 1-1–1-N. In FIG. 4, B denotes a signal for communicating with the other monitor device 9A or 9B. The signal B is transferred by means of an overhead bit of a transmission signal in the protection system.

Figure 5:
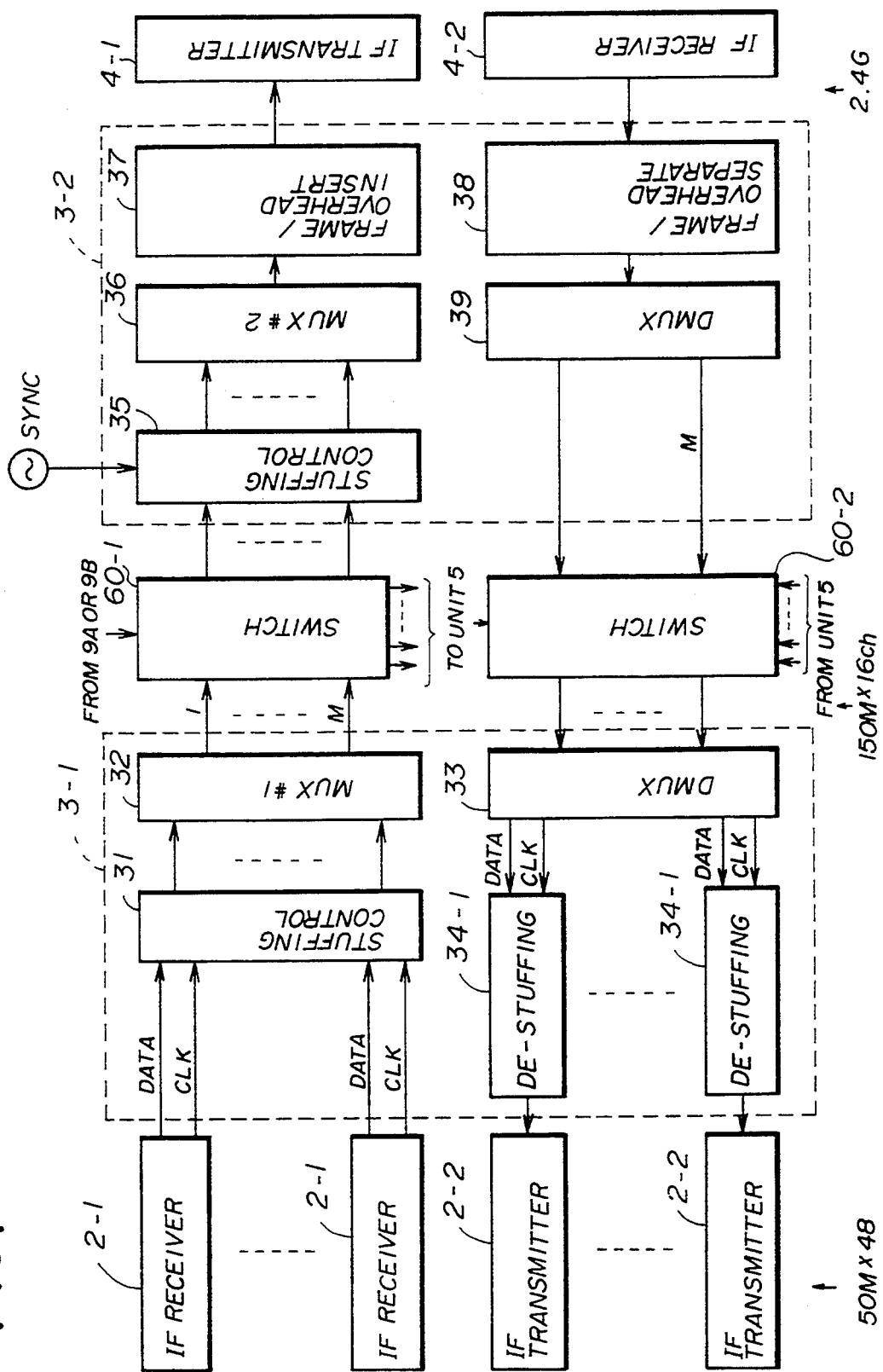
FIG. 5 is a block diagram of a transmitter/receiver device shown in FIGS. 3 and 4.

FIG. 5 is a block diagram showing the structure of each of the transmitter/receiver devices 1-1–1-N in the active system. The low-bit-rate interface units 2 comprise low-bit-rate interface receivers 2-1, and low-bit-rate interface transmitters 2-2. The first multiplexer/demultiplexer unit 3-1 comprises a stuffing control circuit 31, a multiplexer (MUX) 32, a demultiplexer (DMUX) 33, and de-stuffing circuits 34-1. The switching unit 6 comprises two switch circuits 60-1 and 60-2. The second multiplexer/demultiplexer unit 3-2 comprises a stuffing control circuit 35, a multiplexer 36, a framing signal/overhead bit inserting unit 37, a framing signal/overhead bit separating unit 38, and a demultiplexer 39. The high-bit-rate interface unit 4 comprises a high-bit-rate interface transmitter 4-1, and a high-bit-rate interface receiver 4-2.

The stuffing control circuit 31 receives data signals DATA and associated clock signals CLK respectively from the interface receivers 2-1, and synchronizes the data signals DATA with each other. The multiplexer 32 generates M data signals from the synchronized data signals from the stuffing control circuit 31. The switch circuit 60-1 outputs the M data signals to either the second multiplexer/demultiplexer unit 3-2 or the corresponding transmitter/receiver device 1-P in the protection system in accordance with the switch control signal from the corresponding monitor device 9A or 9B. The stuffing control circuit 35 executes a stuffing operation and synchronizes the M data signals from the switch circuit 60-1 with an external clock signal generated by an external clock signal source SYNC for the active system. An external clock signal source (not shown) for the protection system is provided separately from the external clock signal source SYNC shown in FIG. 5. The M data signals output from the stuffing control circuit 35 and synchronized with each other are further multiplexed by the multiplexer 36, which outputs a multiplexed transmission signal to the framing signal/overhead bit inserting unit 37. Then, the unit 37 inserts a framing signal and overhead bits into the multiplexed transmission signal. The multiplexed transmission signal with the framing signal and overhead bits inserted therein is output to the corresponding transmission line via the interface transmitter 4-1.

A multiplexed transmission signal received from the corresponding transmission line via the interface receiver 4-2 is applied to the framing signal/overhead bit separating unit 38, in which the framing signal and overhead bits are separated from the received multiplexed transmission signal. The demultiplexer 39 generates M data signals from the multiplexed transmission signal from the unit 38. The switch circuit 60-2 selects either%the M data signals from the demultiplexer 39 or M data signals from the corresponding transmitter/receiver device 1-P in the protection system. The selected M data signals are applied to the demultiplexer 33, which outputs data signals and associated clock signals. These data signals and the clock signals are output to the respective transmitters 2-2 via the respective destuffing circuits 34-1.

For example, 48 low-bit-rate transmitters 2-1 and 48 receivers 2-2 are provided, and respectively operate with a frequency of, for example, 50 MHz. The number M of data signals generated by the unit 3-1 is equal to, for example, 16, and 16 data signals are transferred to the switch circuit 60-1 with a frequency of, for example 150 MHz. Data signals are also transferred from the switch circuit 60-2 to the demultiplexer 33 with a frequency of 150 MHz. The multiplexed transmission signal is transferred to the high-bit-rate interface transmitter 4-1 with a frequency of 2.4 GHz. Similarly, the multiplexed transmission signal is transferred to the second multiplexer/demultiplexer unit 3-2 with a frequency of 2.4 GHz. Each of the transmitter/receiver devices 1-P has almost the same configuration as shown in FIG. 5 except for the internal circuit of each of the switch circuits 60-1 and 60-1, as will be described later.

Figure 6:
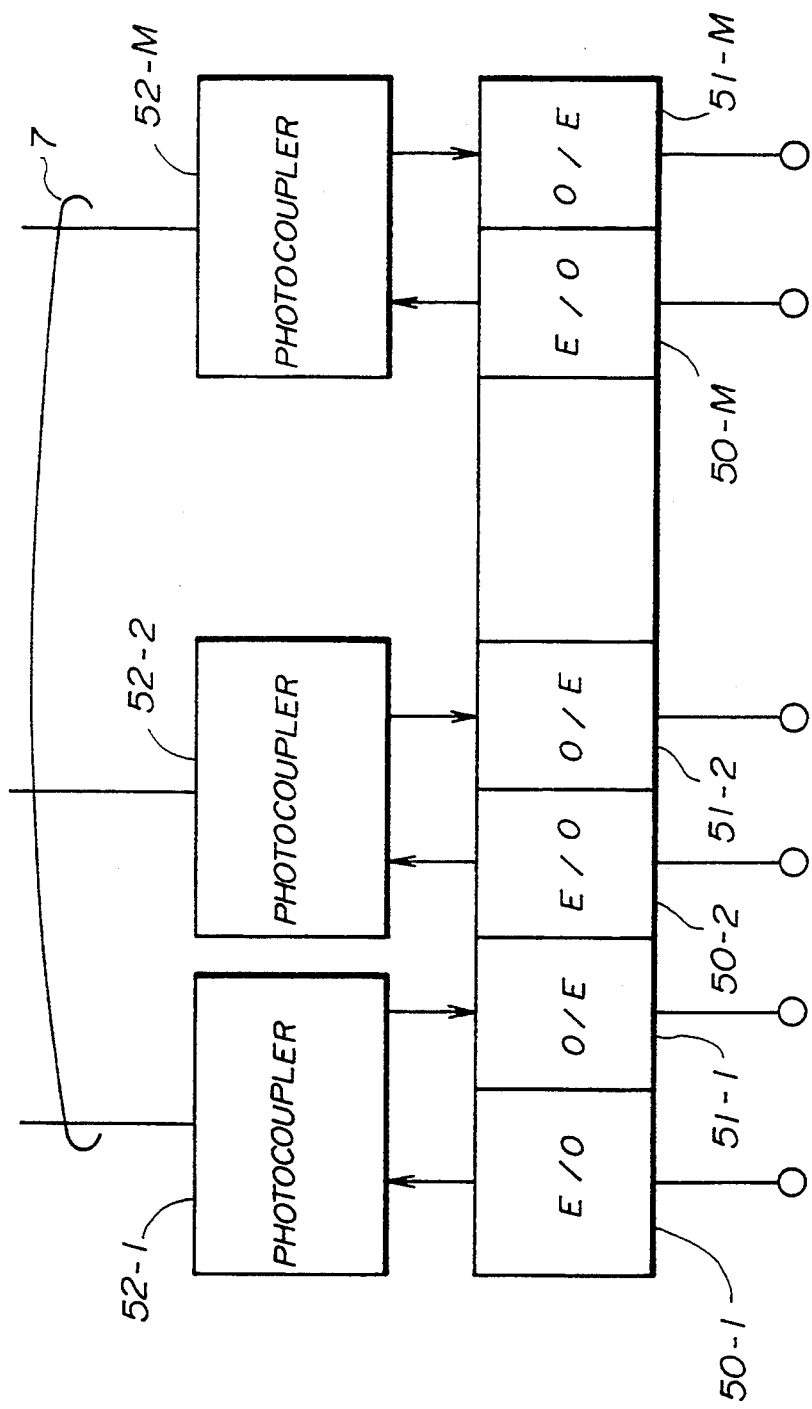
FIG. 6 is a block diagram of a conversion unit used in the embodiments of the present invention.

FIG. 6 is a block diagram of the conversion unit 5 provided in each of the transmitter/receiver units 1-1-1-N in the active system. The conversion unit 5 includes an array type optical module, which comprises M electro-optic elements (E/O) 50-1-50-M, M opto-electric elements (O/E) 51-1-51-M, and M photocouplers 52-1-52-M. It will be noted that M is equal to the number of signals multiplexed by the first multiplexer/demultiplexer unit 3-1 and the number of signals output from the second multiplexer/demultiplexer unit 3-2. M signal lines respectively connected to the electro-optic elements 50-1-50-M are connected to the switch circuit 60-1 shown in FIG. 5, and M signal lines respectively connected to the opto-electric elements 51-1-51-M are connected to the switch circuit 60-2 shown in FIG. 5. The photocouplers 52-1-52-M are respectively provided for pairs of the elements (50-1, 50-1)-(50-M, 51-M). As shown in FIG. 6, M optical fibers are respectively connected to the M photocouplers 52-1-52-M. The M optical fibers are coupled to the corresponding conversion unit 5-i of the corresponding transmitter/receiver device 1-P in the protection system.

Figure 7:
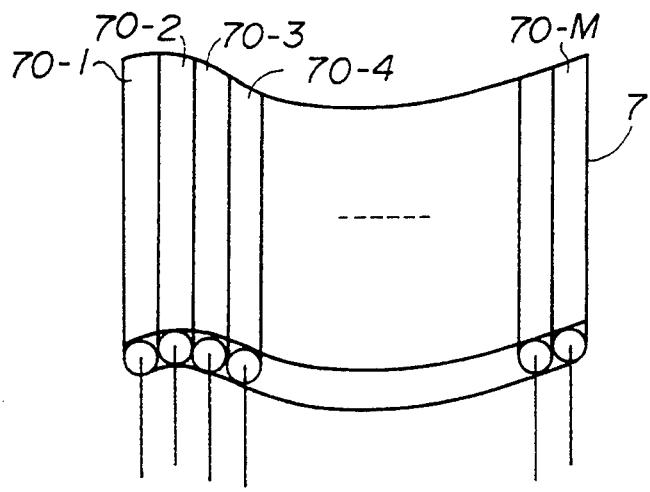
FIG. 7 is a diagram of an optical fiber cable used in the embodiments of the present invention.

It is preferable that, as shown in FIG. 7, the M optical fibers, labeled 70-1-70-M, are bound together so that a ribbon type cable 7 is formed. The ribbon type cable 7 is handled as if it were a single optical fiber cable.

Each of the conversion elements 5-1-5-N in each of the transmitter/receiver units 1-P in the protection system is configured in the same manner as shown in FIG. 7.

Figure 8A:
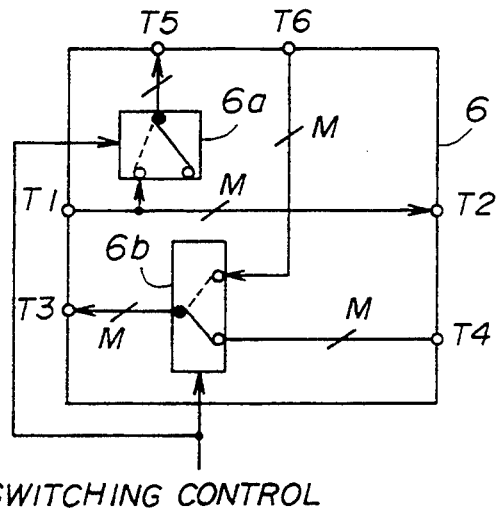
FIG. 8A is a block diagram of a switching unit used in an active system in the first embodiment of the present invention.

FIG. 8A is a block diagram of each of the switching units 6 in the active system. Each of the switching units 6 comprises switches 6a and 6b, which correspond to the switch circuits 60-1 and 60-2 shown in FIG. 5, respectively. A terminal T1 is connected to the multiplexer 32 shown in FIG. 5, and a terminal T2 is connected to the stuffing control circuit 35 shown therein. A terminal T4 is connected to the demultiplexer 39 shown in FIG. 5, and a terminal T6 is connected to the conversion unit 5. A terminal T3 is connected to the demultiplexer 33 shown in. FIG. 5. A terminal T5 is connected to the conversions unit 5. The switching operations of the switches 6a and 6b are controlled by the switching control signal generated by the corresponding monitor device 9A or 9B. In the normal state, the switches 6a and 6b have respective states shown in FIG. 8A. When the protection system is used, the switches 6a and 6b operate in response to the switching control signal, as indicated by broken lines in FIG. 8A.

Figure 8B:
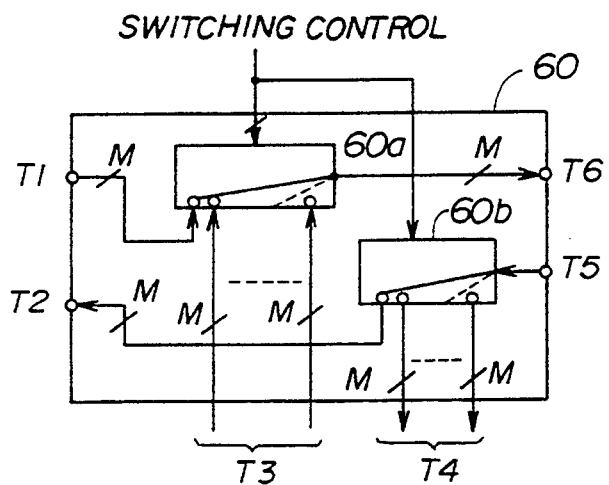
FIG. 8B is a block diagram of a switching unit used in a protection system in the first embodiment of the present invention.

FIG. 8B is a block diagram of each of the switching units 60 in the protection system. Each of the switching units 60 comprises switches 60a and 60b, which correspond to the switch circuits 60-1 and 60-2 shown in FIG. 5, respectively. A Terminal T1 is connected to the first multiplexer/demultiplexer unit 3-1 shown in FIG. 3, and terminals T3 are connected to the conversion elements 5-1-5-N, respectively. A terminal T6 is connected to the second multiplexer/demultiplexer unit 3-2. A terminal T2 is connected to the first multiplexer/demultiplexer unit 3-1, and terminals T4 are connected to the conversion elements 5-1-5-N, respectively. A terminal T5 is connected to the second multiplexer/demultiplexer unit 3-2. The switch 60a selects one of the (N+1) M-bit lines, and the switch 60b selects one of the (N+1) M-bit lines in accordance with the switch controlling signal generated by the monitor device 9A or 9B.

A description will now be given of the operation of the first embodiment of the present invention. In the normal state in which no fault has occurred in the active system, the switching units 6a of the transmitter/receiver devices 1-1-1-N select the first and second multiplexer units 3-1 and 3-2 provided therein. Similarly, the switching units 60 of the transmitter/receiver devices 1-P in the protection system select the first and second multiplexer units 3-1 and 3-2 provided therein.

If a fault has occurred in the transmission line L-S1 in the active system, the monitor device 9A and/or 9B detects the above fault, and notifies the other monitor device of the occurrence of the fault by means of the signals B (FIG. 4). Thereafter, the monitor devices 9A and 9B respectively output the switching control signals A1 (FIG. 4) to the transmitter/receiver units 1-1, so that the switching units 6 provided therein select the conversion units 5. Further, the monitor devices 9A and 9B respectively output the switching control signals Ap to the switching units 60, so that the switching units 60 select the conversion units 5-1. Thereby, the first multiplexer/demultiplexer units 3-1 of the transmitter/receiver devices 1-1 and the second multiplexer/demultiplexer units 3-2 in the protection system are connected to each other via the switching units 6, the conversion units 5, the optical fiber cables 7-1, the conversion units 5-1, and the switching units 60.

Figure 1:
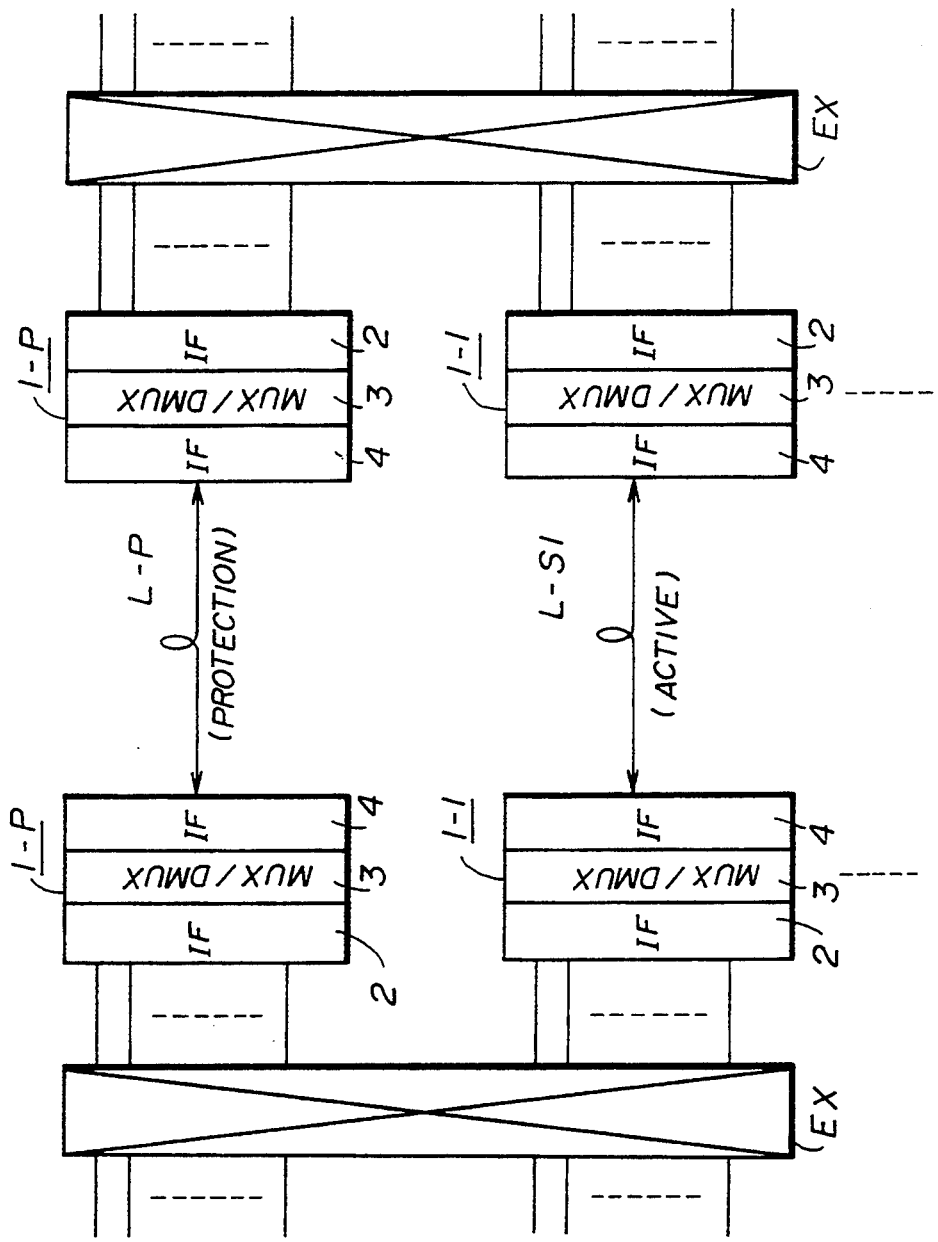
FIG. 1 is a block diagram of a conventional optical communications system for an optical fiber communications system.
Figure 2:
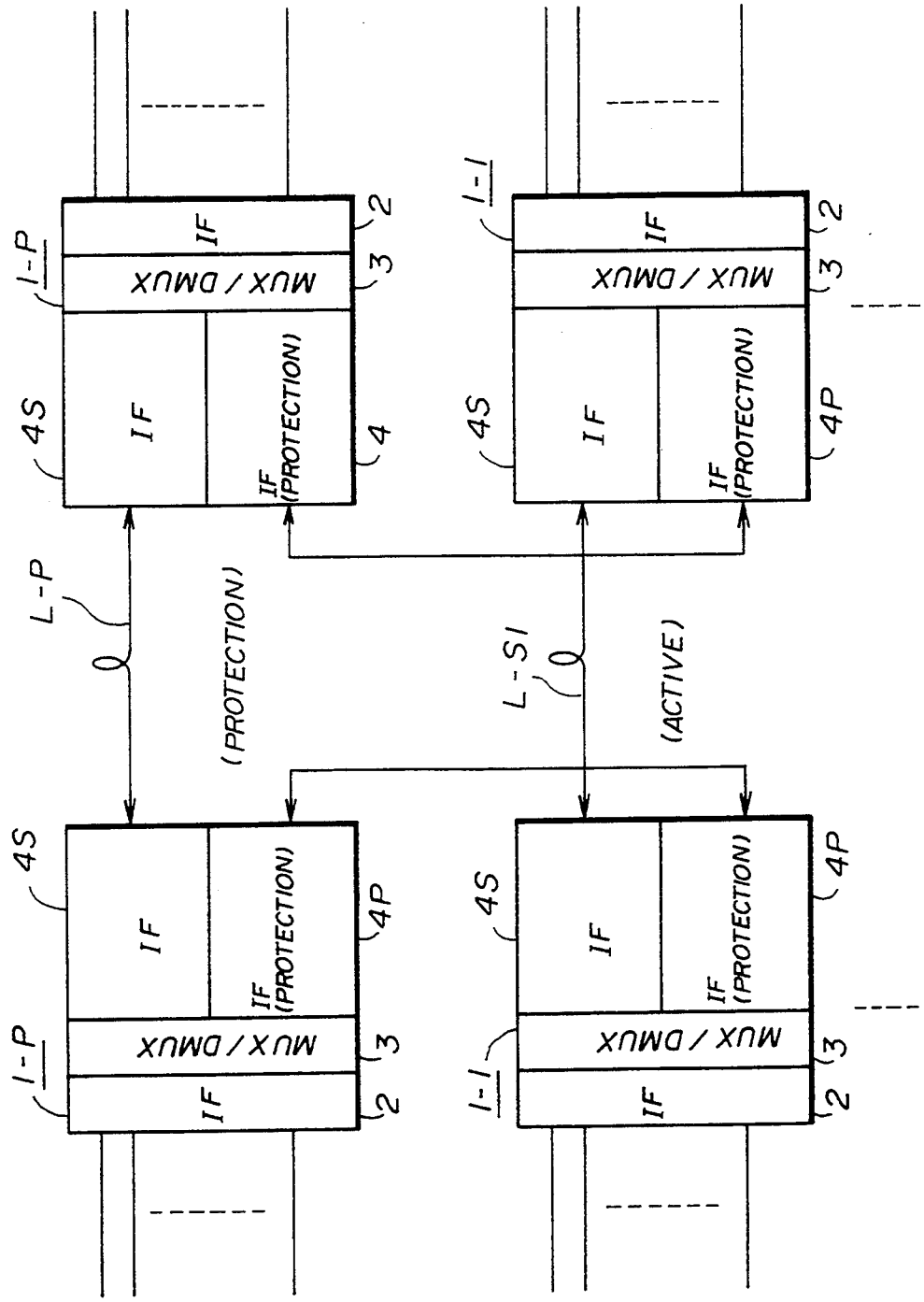
FIG. 2 is a block diagram of another conventional optical communications system for an optical fiber communications system.

It should be noted that data signals from the transmitter/receiver devices 1-1 are synchronized with the external clock signal SYNC by means of the stuffing control circuit 35 of the second multiplexer/demultiplexer unit 3-2. In addition, the framing signal and the overhead bits are added to the multiplexed transmission signal from the active system in the second multiplexer/demultiplexer unit 3-2. Hence, it is not necessary to return the data signals from the active line to the multiplexer/demultiplexer unit 3 as in the case of the prior art shown in FIG. 2. Further, the N optical fiber cables are needed to connect the protection system and the active system for each group. Hence, the system structure is very compact.

A description will now be given of a second embodiment of the present invention with reference to FIG. 9. In the system structure shown in FIG. 9, adjacent transmitter/receiver devices are coupled to each other by means of the optical fiber cable 7, each having M optical fibers when each of the transmitter/receiver devices outputs M data signals. For example, the transmitter/receiver units 1-P in the protection system are respectively connected to the transmitter/receiver devices 1-1 in the active system. It is preferable to form each of the optical fiber cables 7 with a ribbon type cable as shown in FIG. 7.

Figure 10:
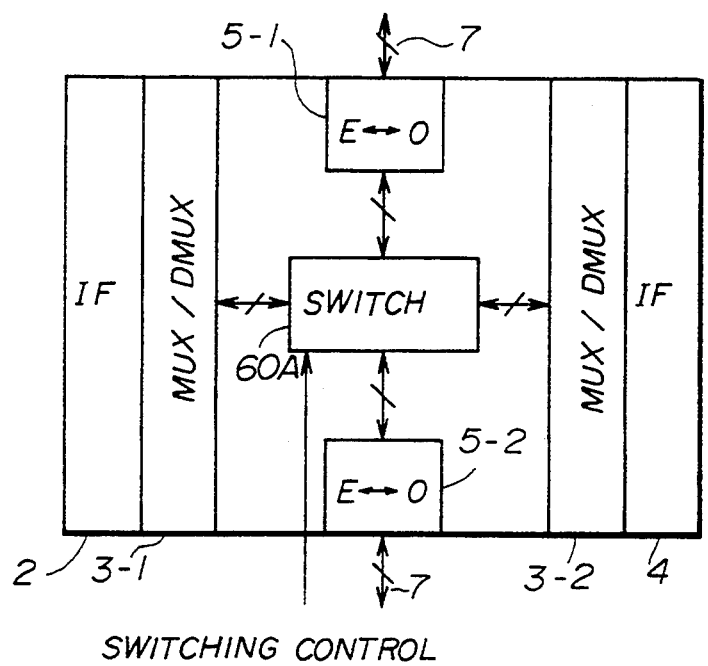
FIG. 10 is a block diagram of a transmitter/receiver device used in the second embodiment of the present invention.

FIG. 10 shows the structure of each of the transmitter/receiver devices 1-P and 1-1-1-N. In FIG. 10, parts which are the same as parts shown in the previously described figures are given the same reference numerals. Each of the transmitter/receiver devices comprises, in addition to the aforementioned low-bit-rate interface unit 2, the first and second multiplexer/demultiplexer units 3-1 and 3-2, and the high-bit-rate interface unit 4, two conversion units 5-1 and 5-2, and a switching unit 60A. The conversion unit 5-1 is connected to the optical fiber cable 7 connected to one of the two adjacent transmitter/receiver units (not shown in FIG. 10). Similarly, the conversion unit 5-2 is connected to the optical fiber cable 7 connected to the other adjacent transmitter/receiver unit. Each of the conversion units 5-1 and 5-2 is formed with the array-type optical module shown in FIG. 6.

Figure 11:
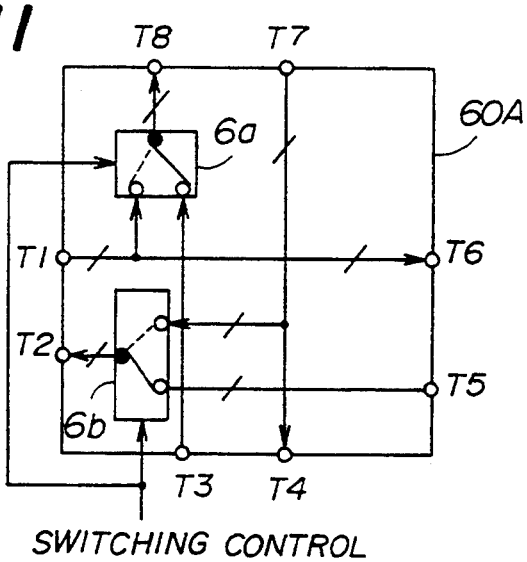
FIG. 11 is a block diagram of a switching unit used in the second embodiment of the present invention.

FIG. 11 shows the switching unit 60A shown in FIG. 10. The switching unit 60A comprises two switches 6a and 6b, and terminals T1-T8. The terminal T1 is connected to the first multiplexer/demultiplexer unit 3-1, and the terminal T6 is connected to the second multiplexer/demultiplexer unit 3-2. The terminals T1 and T6 are directly connected to each other. The terminal T5 is connected to the second multiplexer/demultiplexer unit 3-2, and the terminal T2 is connected to the first multiplexer/demultiplexer unit 3-1. The terminal T7 is connected to one of the two adjacent transmitter/receiver devices, and the terminal T4 is connected to the other transmitter/receiver device. The terminals T4 and T7 are directly connected to each other. The switch 6b selects either the terminal T5 or the terminal T7 (T4). The terminal T8 is connected to one of the two adjacent transmitter/receiver devices, and the terminal T3 is connected to the other transmitter/receiver device. The switch 6a selects either the terminal T1 (T6) or the terminal T3. Normally, the switches 6a and 6b are maintained in respective states shown in FIG. 11. Hence, all the transmitter/receiver devices in the same group are connected to each other. When the protection system is used, the switches 6a and 6b are switched in response to the switching control signal, as indicated by broken lines in FIG. 11.

In the second embodiment, the transmitter/receiver devices 1-P in the protection systems can be the same as the transmitter/receiver devices 1-1-1-N in the active system. Hence, the second embodiment is simpler than the first embodiment.

Figure 12:
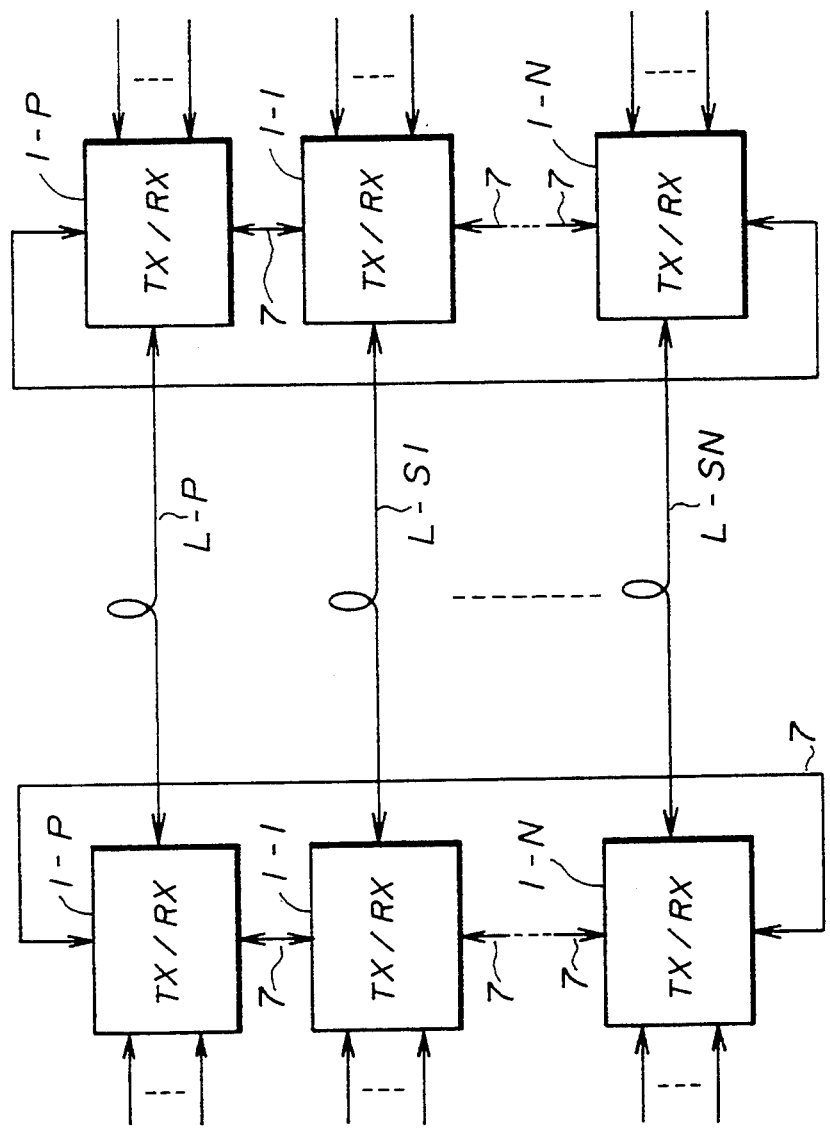
FIG. 12 is a block diagram of an optical communications system according to a third embodiment of the present invention.

A description will now be given of a third embodiment of the present invention with reference to FIG. 12. The third embodiment shown in FIG. 12 corresponds to a modification of the second embodiment. As shown in FIG. 12, the transmitter/receiver devices 1-P in the protection system are respectively connected to the transmitter/receiver devices 1-N in the active system. In this manner, a loop circuit is formed including the transmitter/receiver device 1-P and 1-1-1-N present in the same group.

If a fault has occurred in one of the optical fiber cables 7 respectively connecting the adjacent transmitter/receiver devices to each other in the second embodiment of the present invention, the transmission line switching operation cannot be correctly carried out. On the other hand, the third embodiment shown in FIG. 12 does not have the above problem of the second embodiment. Even if a fault has occurred in one of the optical fiber cables 7 respectively connecting the adjacent transmitter/receiver devices to each other in the third embodiment, the transmission line switching operation can be correctly carried out.

The present invention is not limited to the specifically disclosed embodiments, and variations and modifications may be made without departing from the scope of the present invention.

What is claimed is:

1. A communications system comprising:
    a plurality of optical transmission lines in an active system and an optical transmission line in a protection system; and
    transmitter/receiver devices connected to respective ends of the optical transmission lines,
    said transmitter/receiver devices respectively comprising:

first interface means for establishing a first interface with external electric or optical signal transmission lines;

second interface means for establishing a second interface with one of the optical transmission lines;

first multiplexer/demultiplexer means, coupled to said first interface means, for executing a first multiplexing and demultiplexing operation;

second multiplexer/demultiplexer means, coupled to said second interface means, for executing a second multiplexing and demultiplexing operation;

switching means, provided between said first and second multiplexer/demultiplexer means, for selectively coupling the first multiplexer/demultiplexer means in the active system with the second multiplexer/demultiplexer means in the protection system in said transmitter/receiver devices at one end of the optical transmission lines and for selectively coupling the second multiplexer/demultiplexer means in the protection system with the first multiplexer/demultiplexer means in the active system in said transmitter/receiver devices at another end of the optical transmission lines, wherein the coupling is provided by means of one of the optical transmission lines consisting of an optical fiber cable.

2. A communications system as claimed in claim 1, wherein said switching means of each of the transmitter/receiver devices in the protection system comprises:
   a group of first conversion units respectively provided for the transmitter/receiver devices in the protection system via the optical fiber cables, said group converting light signals transferred via the optical fiber cables into electric signals and vice versa; and
   first switch circuit means for connecting said first and second multiplexer/demultiplexer means to each other in a first mode in which there is no fault in the active system and for connecting one of said first conversion units to one of the first and second multiplexer/demultiplexer means in a second mode in which a fault has occurred in the active system.

3. A communications system as claimed in claim 2, wherein each of said optical fiber cables comprises M optical fibers where M is an integer and is equal to a number of signals obtained by a multiplexing operation by said first multiplexer/demultiplexer means.

4. A communications system as claimed in claim 3, wherein said M optical fibers are bound together so that each of said optical fiber cables is a ribbon type optical fiber cable.

5. A communications system as claimed in claim 3, wherein each of said first conversion units of the group comprises an array of:
   M photocouplers respectively connected to said M optical fibers;
   M electro-optic conversion elements respectively coupled to said M photocouplers; and
   M opto-electric conversion elements respectively coupled to said M photocouplers.

6. A communications system as claimed in claim 2, wherein said switching means of each of said transmitter/receiver devices in the active system comprises:
   a second conversion unit for converting one of the light signals from the protection system to an electric signal and vice versa; and
   second switch circuit means for connecting said first and second multiplexer/demultiplexer means to each other in the first mode and for connecting said second conversion unit to one of the first and second multiplexer/demultiplexer means in the second mode.

7. A communications system as claimed in claim 1, wherein each of said optical fiber cables connects two adjacent transmitter/receiver units among said transmitter/receiver units.

8. A communications system as claimed in claim 7, wherein said switching means of each of the transmitter/receiver devices in the active and protection system comprises:
   a first conversion unit for converting a first light signal transferred via one of the optical fiber cables from one of the two adjacent transmitter/receiver devices into a first electric signal and vice versa;
   a second conversion unit for converting a second light signal transferred via one of the optical fiber cables from the other one of the two adjacent transmitter/receiver devices into a second electric signal and vice versa; and
   switching circuit means for connecting the two adjacent transmitter/receiver devices via the optical fiber cables in a first mode in which there is no fault in the active system and for one of the first and second multiplexer/demultiplexer means to one of the first and second conversion units in a second mode in which a fault has occurred in the active system.

9. A communications system as claimed in claim 7, wherein one of said optical fiber cables comprises M optical fibers where M is an integer and is equal to a number of signals obtained by a multiplexing operation by said first multiplexer/demultiplexer means.

10. A communications system as claimed in claim 7, wherein one of said optical fiber cables connects one of the transmitter/receiver devices in the protection system and one of the transmitter/receiver devices in the active system, so that a loop is formed comprising the transmitter/receiver devices in the protection and active systems and the optical fiber cables.

11. A communications system as claimed in claim 1, further comprising monitor means for detecting a fault which has occurred in the active system and for controlling said switching means so that a communications path is formed including the first multiplexer/demultiplexer means in the active system, the second multiplexer/demultiplexer means in the protection system and one of the transmission lines in the protection system.

12. A communications system as claimed in claim 1, wherein:
   said second multiplexer/demultiplexer means comprises means for generating a synchronizing signal; and
   said second multiplexer/demultiplexer synchronizes digital signals obtained from said switching means with said synchronizing signal.

13. A communications system as claimed in claim 1, wherein a first bit rate of signals transferred via the optical transmission lines is higher than a second bit rate of the electric or optical signal transmission lines.

14. A communications system as claimed in claim 6, further comprising monitor means for detecting a fault which has occurred in the active system and for controlling said first and second switch circuit means so that a communications path is formed including the first multiplexer/demultiplexer means in the active system, the second multiplexer/demultiplexer means in the protection system and one of the transmission lines in the protection system.

15. A communications system as claim 8, further comprising monitor means for detecting a fault which has occurred in the active system and for controlling said switch circuit means so that a communications path is formed including the first multiplexer/demultiplexer means in the active system, the second multiplexer/demultiplexer means in the protection system and the transmission lines between the active system and the protection system.

* * * * *